United States Patent
Shieh et al.

(10) Patent No.: US 8,078,508 B1
(45) Date of Patent: Dec. 13, 2011

(54) METHOD AND SYSTEM FOR UPGRADING TO AN INTEGRATED FINANCIAL PRODUCT

(75) Inventors: Charles Shieh, Cupertino, CA (US);
Stephanie Martini, Leeds, UT (US);
Jan Panero Benway, San Carlos, CA (US); Miriam Nga-Shun Vu, San Francisco, CA (US)

(73) Assignee: Intuit Inc., Mountain View, CA (US)

( * ) Notice: Subject to any disclaimer, the term of this patent is extended or adjusted under 35 U.S.C. 154(b) by 362 days.

(21) Appl. No.: 12/020,325

(22) Filed: Jan. 25, 2008

(51) Int. Cl.
*G07B 17/00* (2006.01)
*G07F 19/00* (2006.01)
*G06Q 20/00* (2006.01)
*G06F 15/02* (2006.01)
*G07C 1/10* (2006.01)

(52) U.S. Cl. ............................... 705/30; 705/19; 705/32

(58) Field of Classification Search ............... 705/22–30
See application file for complete search history.

(56) References Cited

U.S. PATENT DOCUMENTS

| 2001/0029475 A1 * | 10/2001 | Boicourt et al. ................. 705/30 |
| 2004/0117615 A1 * | 6/2004 | O'Donnell et al. ........... 713/155 |
| 2004/0125954 A1 * | 7/2004 | Riebe et al. ................... 380/231 |

* cited by examiner

*Primary Examiner* — Matthew Gart
*Assistant Examiner* — Ig T An
(74) *Attorney, Agent, or Firm* — Osha • Liang LLP

(57) ABSTRACT

A method for upgrading from a stand-alone product to an integrated financial product, that includes generating a plurality of product accounts associated with a user of the stand-alone product, modifying, while using the stand-alone product, the plurality of product accounts with financial transaction data associated with the user, activating the integrated financial product after modifying the plurality of product accounts, and accessing the financial transaction data using a financial module of the integrated financial product, wherein functionality provided by the stand-alone product is distinct from functionality provided by the financial module.

19 Claims, 6 Drawing Sheets

| Payroll Item (bank, tax, or deduction/addition) | Payroll Expense Account | Payroll Liability Account | Bank Asset Account |
|---|---|---|---|
| Paycheck Bank | | | Checking |
| Liability Payment Bank | | | Checking |
| Liability Payment Other Fees | Payroll Expenses: Other Fees | | |
| Direct Deposit Bank | | Direct Deposit Payable | User-Specified Direct Deposit Bank Account |
| Federal Income Tax | | Payroll Tax Payable | |
| Social Security Tax | Payroll Expenses | Payroll Tax Payable | |
| Medicare | Payroll Expenses | Payroll Tax Payable | |
| Advanced Earned Income Credit | | Payroll Tax Payable | |
| Federal Unemployment Tax (FUTA) | Payroll Expenses | Payroll Tax Payable | |
| State Income Tax | | Payroll Tax Payable | |
| State Unemployment Tax (SUTA) | Payroll Expenses | Payroll Tax Payable | |
| Compensation (incl. Paycheck Tips) | Payroll Expenses | | |
| Pre-Tax EE Paid Health/Dental/Vision | | Payroll Clearing | |
| Company-Paid Health/Dental/Vision | Payroll Expenses | Payroll Clearing | |
| S Corp. Medical | Payroll Expenses | Payroll Clearing | |
| Health Savings Acct – Company-Paid | Payroll Expenses | Payroll Clearing | |
| Group-Term Life – Non-Taxable/Taxable | Payroll Expenses | Payroll Clearing | |
| 401K/403b (regular & Roth) | | Payroll Clearing | |
| 401K/403b Company Match | Payroll Expenses | Payroll Clearing | |
| After-Tax/Simple IRA | | Payroll Clearing | |
| Simple IRA Company Match | Payroll Expenses | Payroll Clearing | |
| Non-Taxable Housing Allowance | Payroll Expenses | | |
| Wage Garnishment | | Payroll Clearing | |
| Generic Non-Taxable Payment | Payroll Expenses | Payroll Clearing | |
| Cash Advance | | | Employee Cash Advances |
| Cash Advance Repayment | | | Employee Cash Advances |
| Generic After-Tax Deduction | | Payroll Clearing | |
| Paid Vacation/Sick Time | Payroll Expenses | | |

FIGURE 5

METHOD AND SYSTEM FOR UPGRADING TO AN INTEGRATED FINANCIAL PRODUCT

BACKGROUND

In a general sense, the concept of managing finances includes performing, recording, reporting, and analyzing financial transactions. The financial transactions may include both monetary or non-monetary based transactions. For example, the financial transactions may include exchanging money for a service, collecting raw goods, transforming the raw goods into a product, selling the product, billing for the product, exchanging goods and/or services between entities, paying interest and principle on a loan, owning assets, paying a salary, and/or other transactions.

Historically, financial management has been performed by individuals and/or financial consultants using journals, checkbooks, ledgers, as well as a myriad of other paper-based tools. The advent of computers and the use of computer software for financial management has led to greater efficiency and understanding of the financial data resulting from financial transactions. For example, an experienced, knowledgeable user of spreadsheet software may program the spreadsheet to perform a variety of statistical operations on the financial data and generate graphs and reports to optimize future financial transactions.

Financial products (e.g., software applications and/or services) improve the efficiency in managing finances. Specifically, financial products provide tools to efficiently perform financial transactions and calculate and analyze the financial data. Businesses, both large and small, rely on financial products to manage the finances of the business by managing the various financial transactions and accounts of the business.

Often, small businesses purchase financial products with differing levels of financial management functionality. For example, a small business without many financial resources may evaluate different financial products, each providing a wide array of features and modules (some of which are deemed essential and others a luxury). Initially, the small business may select a financial product that provides basic functionality and/or performs one essential task (i.e., invoicing or payroll). After the business and financial resources grow, the business is no longer satisfied with the basic functionality provided by the financial product. Thus, the business upgrades to an integrated financial product that provides additional functionality (such as features and/or modules once deemed a luxury).

SUMMARY

In general, in one aspect, the invention relates to a method for upgrading from a stand-alone product to an integrated financial product, that includes generating a plurality of product accounts associated with a user of the stand-alone product, modifying, while using the stand-alone product, the plurality of product accounts with financial transaction data associated with the user, activating the integrated financial product after modifying the plurality of product accounts, and accessing the financial transaction data using a financial module of the integrated financial product, wherein functionality provided by the stand-alone product is distinct from functionality provided by the financial module.

In general, in one aspect, the invention relates to a system that includes a product storage module configured to store a plurality of product accounts, a stand-alone product used by a user and configured to generate the plurality of product accounts associated with the user of the stand-alone product, modify the plurality of product accounts with financial transaction data associated with the user, and a financial module of an integrated financial product configured to access the financial transaction data, wherein the integrated financial product is activated after modifying the plurality of product accounts, and wherein functionality provided by the stand-alone product is distinct from functionality provided by the financial module.

In general, in one aspect, the invention relates to a computer readable medium that includes computer readable program code embodied therein for causing a computer system to generate a plurality of product accounts associated with a user of the stand-alone product, and modify the plurality of product accounts with financial transaction data associated with the user, wherein an integrated financial product is activated after modifying the plurality of product accounts, wherein the financial transaction data is accessed using a financial module of the integrated financial product, and wherein functionality provided by the stand-alone product is distinct from functionality provided by the financial module.

Other aspects of the invention will be apparent from the following description and the appended claims.

BRIEF DESCRIPTION OF DRAWINGS

FIG. 5 shows an example in accordance with one or more embodiments of the invention.

DETAILED DESCRIPTION

Figure 1:
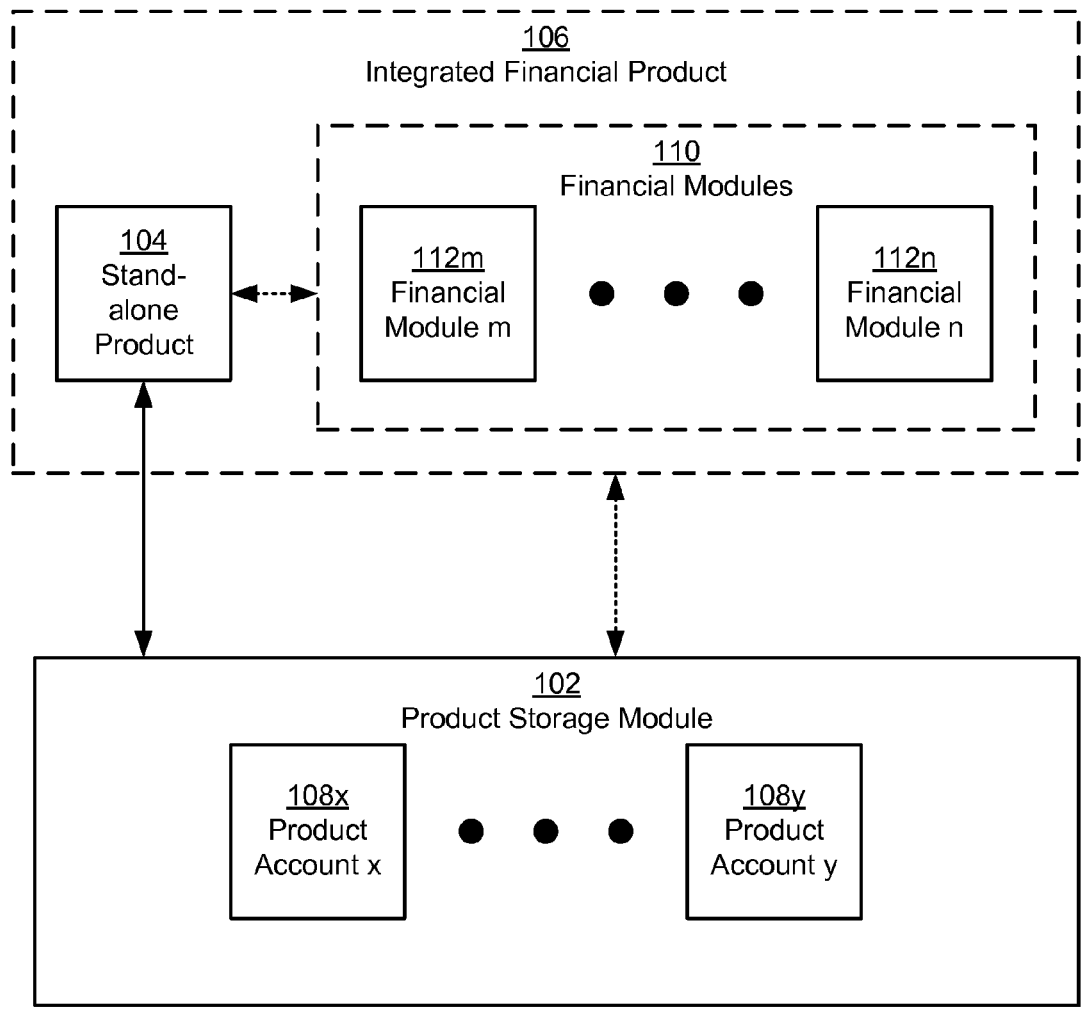
FIG. 1 shows a schematic diagram of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for upgrading to an integrated financial product. Embodiments of the invention provide a stand-alone product that stores financial transaction data into multiple product accounts that may or may not be exposed to the user. Later, the user may upgrade to an integrated financial product with a financial module that provides distinct functionality from the stand-alone product. The financial module can access and use the financial transaction data previously stored by the stand-alone product.

FIG. 1 shows a schematic diagram of a system in accordance with one or more embodiments of the invention. As shown in FIG. 1, the system includes a product storage module (102), a stand-alone product (104), and an integrated financial product (106). Each of these components is described below.

A product storage module (102) is a storage repository. For example, the product storage module (102) may be a file system, database, collection of tables, or any other storage mechanism. The product storage module (102) maintains, among other necessary data, product accounts (e.g., product account x (108x), product account y (108y)). In one or more embodiments of the invention, the product storage module is compartmentalized. For example, a product account (e.g., product account x (108x), product account y (108y)) is a compartment that stores a portion of the financial transaction data. For example, each product account may be a file, a table, or a grouping of tables in a database. Further, the product storage module (102) may reside as a separate storage repository (as shown in FIG. 1) or be combined with other storage repositories. Further, the product storage module (102) may be a single storage repository or separated into multiple storage repositories.

Different types of product accounts (e.g., product account x (108x), product account y (108y)) may exist. Product accounts (e.g., product account x (108x), product account y (108y)) may be accounts used solely by a stand-alone product (104), by one or more financial modules (e.g., financial module m (112m), financial module n (112n)) of the integrated financial product (106), or any combination thereof. The different types of product accounts may include asset accounts, liability accounts, equity accounts, revenue accounts, and expense accounts. For example, the liability accounts may include a clearing account, a tax payable account, a direct deposit payable account, or any other type of liability account. Similarly, the asset accounts may include a checking account, a direct deposit bank account, a cash advance account, or any other type of asset account. One skilled in the art will appreciate that the aforementioned accounts are only examples of the product accounts (e.g., product account x (108x), product account y (108y)) used by a business and that may be stored in the product storage module (102).

The stand-alone product (104) is a financial tool directed towards a specific type of financial service. Specifically, the stand-alone product (104) assists a user in performing directed financial functions (i.e., a type of financial transaction). For example, the stand-alone product (104) may assist a user (i.e., a business owner or agent of the business using the product) to pay employees, create invoices, track and order inventory, process credit cards, or perform any other such financial function. The stand-alone product (104) includes a backend (not shown) and an interface (not shown) in accordance with one or more embodiments of the invention.

In one or more embodiments of the invention, the backend of the stand-alone product (104) includes functionality to generate multiple product accounts. The number and types of product accounts generated by the backend (e.g., product account x (108x), product account y (108y)) are not required for the stand-alone product (104) to perform the financial function in accordance with one or more embodiments of the invention. Rather, the number and types of product accounts (e.g., product account x (108x), product account y (108y)) are generated by the backend for the situation in which the user (or other decision-maker) decides to upgrade to the integrated financial product. Thus, the backend proactively generates a storage framework that eases upgrading to the integrated financial product (106).

Further, in one or more embodiments of the invention, the backend includes functionality to store and modify financial transaction data in the product accounts (e.g., product account x (108x), product account y (108y)), when such functionality is required by the stand-alone product. Specifically, the backend includes functionality to interpret which product accounts (e.g., product account x (108x), product account y (108y)) are affected by the financial transaction and update each affected product account (e.g., product account x (108x), product account y (108y)). For example, the backend may include functionality to determine which accounts to debit and which accounts to credit for a specific financial transaction. Thus, the backend may allow for increased performance of the stand-alone product (104) by including functionality to store financial transaction data with greater granularity than required by the stand-alone product (104) and increase the capacity to handle additional product accounts.

The interface of the stand-alone product (104) may include functionality to display information to guide a user while performing financial transactions and to simplify the presentation of financial transaction data (e.g., hide the granularity of financial transaction data stored in the product accounts). In particular, the interface of the stand-alone product (104) may display a portion of financial transaction data stored for each financial transaction to the user (i.e., a business owner or agent of the business using the product). The viewable portion includes the portion related only to performing the financial transaction. The hidden portion may include the information as to which accounts are credited and which accounts are debited for the transaction.

For example, consider a scenario in which the stand-alone product (104) is a stand-alone invoicing product. The invoicing product includes functionality to create and track invoices for the sale of goods and/or services. When an invoice is created, the backend of the stand-alone product (104) may include functionality to credit or debit the appropriate accounts (e.g., accounts receivable, or other accounts associated with the invoicing product). The interface, however, may include functionality to hide the existence of the various product accounts (e.g., asset account, expense account, revenue account, and other such accounts) and display only the invoice, a total amount of unpaid invoices for each customer, and the total amount due for all customers. The invoicing product often stores more data than is viewable to the user.

Continuing with FIG. 1, the system may also include an integrated financial product (106). An integrated financial product (106) includes financial modules (110) and/or functionality provided by the stand-alone product (104).

In one or more embodiments of the invention, the functionality provided by the financial modules (110) is distinct from the functionality provided by the stand-alone product (104). Specifically, the financial modules (110) include additional functionality that is not provided for by the stand-alone product (104). Conversely, the stand-alone product provides functionality that is not provided for by the financial modules (110). More specifically, each financial module (e.g., financial module m (112m), financial module n (112n)) assists the user to perform a separate financial function than the financial function of the stand-alone product (104). For example, the stand-alone product provides the financial function of handling payroll services for employees. Meanwhile, the financial modules (e.g., financial module m (112m), financial module n (112n)) provides the financial function of assisting with inventory tracking, processing credit cards, and/or creating invoices. Additionally, the financial module (e.g., financial module m (112m), financial module n (112n)) may provide accounting services, such as aggregating financial transaction data, generating reports, or performing any other accounting task.

The stand-alone product (104) (or simply the functionality of the stand-alone product (104)) may be a part of the integrated financial product (106). For example, the financial modules (110) may be a part of an upgrade package for the stand-alone product (104). Specifically, the financial modules (110) may be plug-ins to the stand-alone product (104). Alternatively, the financial modules (e.g., financial module m (112m), financial module n (112n)) may be a separate product or several separate products that includes functionality to access, store, and retrieve data from the product storage module (102). Further, the user may choose to discontinue use of the stand-alone product (104).

In another alternative, the integrated financial product (106) may be sold as a completely separate product from the stand-alone product (104). For example, the integrated financial product (106) may be a complete financial management product while the stand-alone product (104) provides only a single financial function. In such an embodiment, the stand-alone product (104) may interface, directly or indirectly, with the integrated financial product (106) and/or one or more financial modules (110). Further the stand-alone product (104) and the integrated financial product (106) share the product storage module (102). In such scenario, the financial modules (110) may be software code modules added to the core software code for the integrated financial product (106).

In one or more embodiments of the invention, financial modules (110) include functionality to access the financial transaction data stored by the stand-alone product (104) in the product storage module (102). The financial modules (110) of the integrated financial product (106) may access the financial transaction data directly or via the stand-alone product (104). Further, in one or more embodiments of the invention, the only update required for the financial modules (110) to access the financial transaction data is an update to reflect the user's actual financial accounts (e.g., banking accounts, credit card accounts, and other accounts). Specifically, the layout of data in the product accounts is directly usable and accessible by the financial modules (110) of the integrated financial product (106) in accordance with one or more embodiments of the invention.

Figure 2:
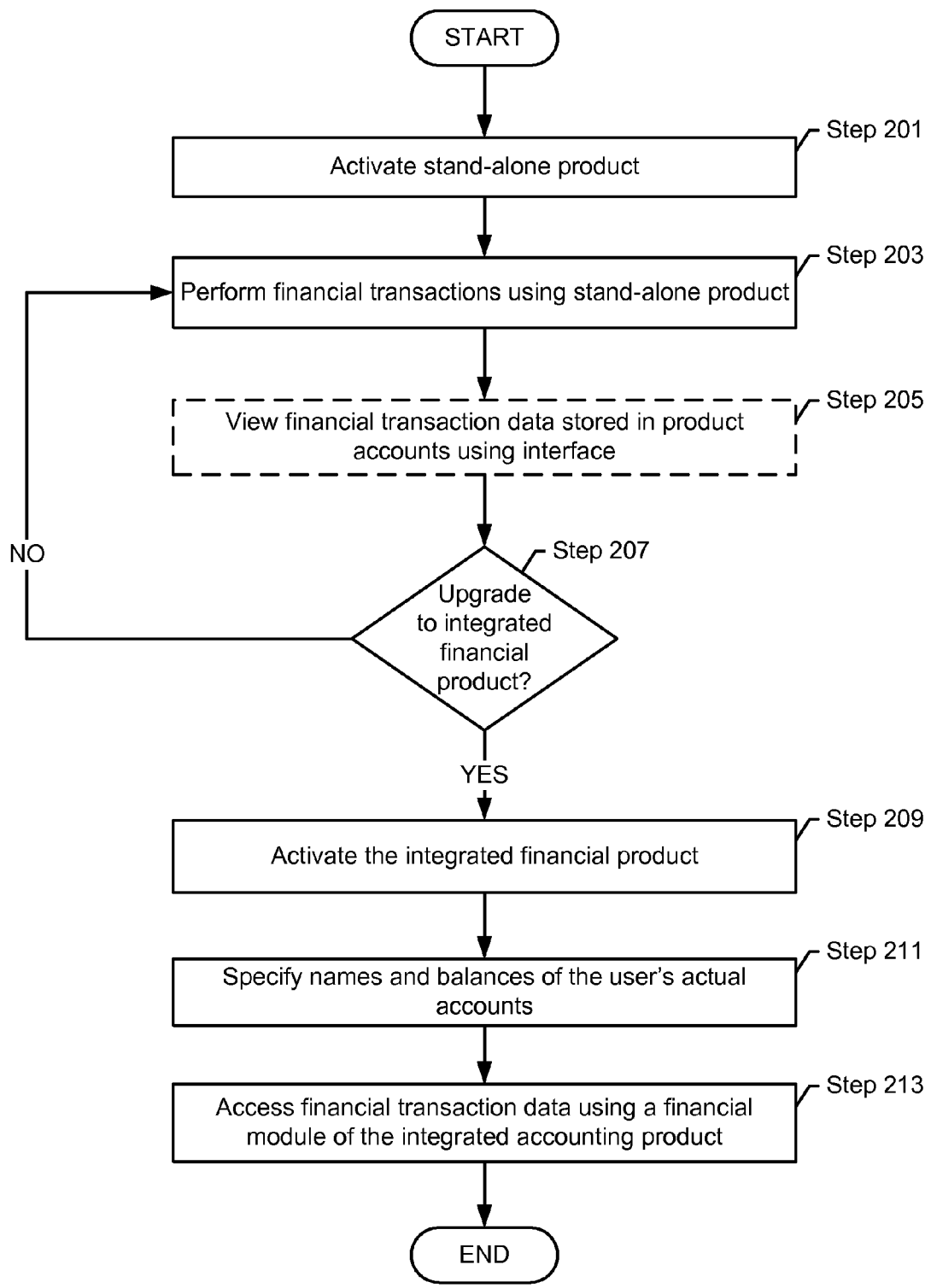
FIGS. 2-4 show flowcharts in accordance with one or more embodiments of the invention.
Figure 3:
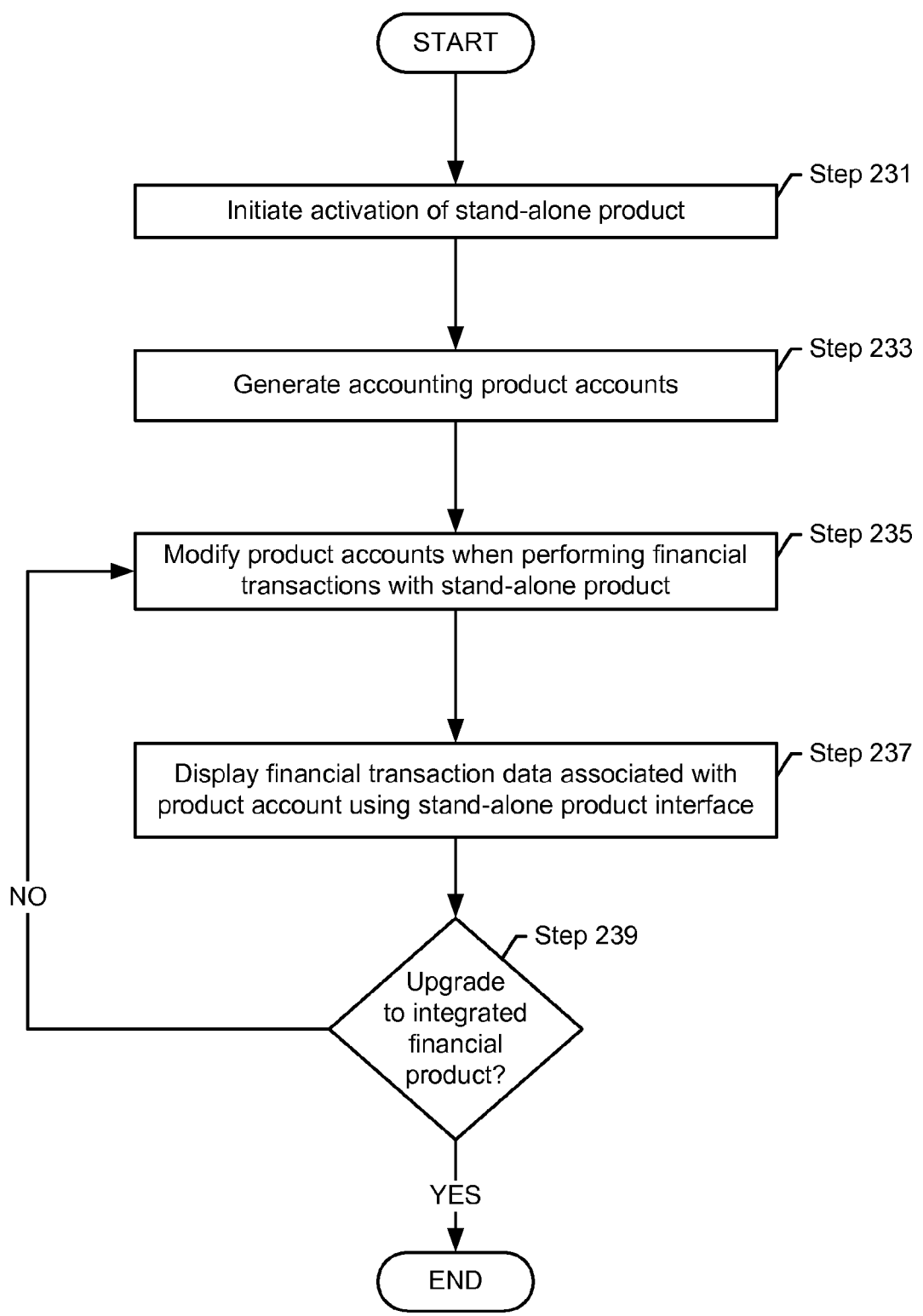
Figure 4:
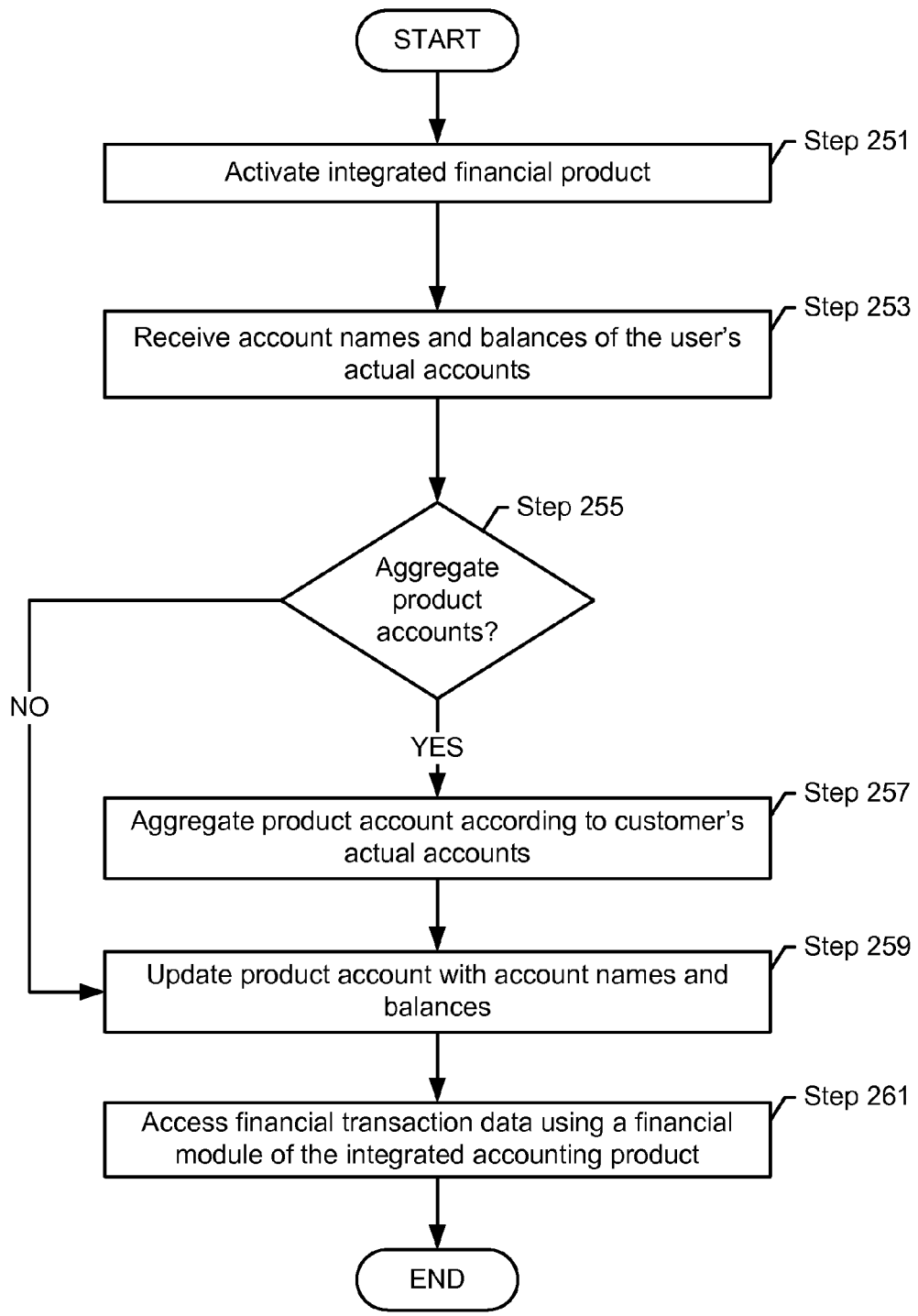

FIGS. 2-4 show flowcharts in accordance with one or more embodiments of the invention. While the various steps in this flowchart are presented and described sequentially, one of ordinary skill will appreciate that some or all of the steps may be executed in different orders, may be combined or omitted, and some or all of the steps may be executed in parallel. In addition, steps such as store acknowledgements have been omitted to simplify the presentation.

FIG. 2 shows a flowchart of a method that may be performed in accordance with one or more embodiments of the invention. Typically, in one or more embodiments of the invention, the user initially determines that the functionality provided by the stand-alone product is sufficient. Accordingly, the user may purchase or otherwise acquire the stand-alone product.

After acquiring the stand alone product, the stand-alone product is activated (Step 201). In one or more embodiments of the invention, activating the stand-alone product may include performing any operations necessary to use the stand-alone product. For example, if the stand-alone product is a local application intended to execute on the user's computer system, then activating the stand-alone product may include executing an installation program on the user's computer system. In another example, if the stand-alone product is a web-application, then activating the stand-alone product may include simply registering the user.

Next, the user performs financial transactions using the stand-alone product (Step 203). Specifically, the user uses the stand-alone product to perform the financial function(s) provided for by the stand-alone product. While using the stand-alone product, the user may submit financial transaction data to the stand-alone product. Specifically, the stand-alone product may guide the user in submitting financial transaction data that the stand-alone product uses to perform the financial function provided by the stand-alone product. For example, consider the scenario in which the stand-alone product is a payroll product. In the example, the stand-alone product may guide the user through a questionnaire that prompts the user to submit financial transaction data to create paychecks for each of the user's employees. In the example, the user may submit the user's bank account number, employee names, amounts to deduct from the employee's paycheck, and other such information.

Further, while or after performing financial transactions, the user may view the financial transaction data stored in the product accounts using the interface of the stand-alone product (Step 205). To the user, the interface of the stand-alone product provides a complete view of the user's financial transactions using the stand-alone product. Specifically, the user can interact with the stand-alone product and perform all operations that the user of the stand-alone product would expect. However, the existence of the multiple product accounts and the mechanism of storing data in the multiple product accounts are hidden to the user. In particular, the interface of the stand-alone product does not display financial transaction data in a manner that the user would understand that the storage mechanism of the financial transaction data is usable by the integrated financial product.

For example, consider the case in which the stand-alone product is an invoicing product and the integrated financial product provides accounting functions. Using the invoicing product, the user may perform all financial functions expected of an invoicing product, such as creating an invoice, identifying the total amount of sales to a customer, viewing a total amount of a certain item sold, and performing other such tasks. While the user is using the invoicing product, the debit and credits of the product accounts for each item of the invoice is hidden from the user. Specifically, in the example, the fact that the invoicing product is storing the financial transaction data for performing accounting (e.g., debiting or crediting revenue accounts, accounts receivable accounts, and other such accounts) is hidden from the user.

Continuing with FIG. 2, while using the stand-alone product, a determination may be made whether to upgrade to the integrated financial product (Step 207). If the user decides not to upgrade to the integrated financial product, then the user continues to perform financial transactions with the stand-alone product (Step 203).

However, if the user decides to upgrade to the integrated financial product, then the user activates the integrated financial product (Step 209). Activating the integrated financial product may be performed in a manner similar to activating the stand-alone product. Specifically, the activation may involve registering the user as a user of an integrated financial product, executing an installation file, or performing any other method known in the art.

In one or more embodiments of the invention, the user is guided through an initial setup of the integrated financial product (not shown). During the initial setup, the user may specify names and balances of the user's actual accounts (Step 211). For example, the setup may request that the user provide a name and balance of the user's bank account(s), credit account(s), as well as any other accounts that the user may have. Further, the user may be requested to specify which of the user's accounts the user uses to make specific types of payments (e.g., paychecks, purchase of inventory or raw materials, liability payments, and other such payments) and which accounts that the user uses to receive payments (e.g., payments from customers, credit payments, and other such payments). In the background, the integrated financial product reconciles the product accounts created by the stand-alone product with the user's actual accounts in accordance with one or more embodiments of the invention.

Accordingly, the user may access the financial transaction data using the integrated financial product (Step 213). In particular, the user may view the financial transactions performed using the stand-alone product in the interface of the integrated financial product in accordance with one or more embodiments of the invention. Moreover, in one or more embodiments of the invention, the user may create graphs and reports of the financial transaction data stored by the stand-alone product. For example, the user may create a profit and loss statement, a balance sheet, a cash flow statement, a trial balance, and a general ledger of the financial transaction data stored by the stand-alone product.

FIG. 3 shows a flowchart of a method for a stand-alone product to store financial transaction data in accordance with one or more embodiments of the invention. Initially, activation of the stand-alone product is initiated (Step 231). Specifically, if the stand-alone product is installed on the user's computer system, then steps for installing the stand-alone product are performed using any technique known in the art. Further, if the stand-alone product is a web-application, then steps for activating the stand-alone product are performed. Thus, as one skilled in the art will appreciate, activating the stand-alone product may be performed using techniques known in the art.

Additionally, product accounts are generated in accordance with one or more embodiments of the invention (Step 233). Specifically, space is reserved to store financial transaction data in the product accounts. Generating product accounts may be performed during the installation, activation and/or while the user is using the stand-alone product. In one or more embodiments of the invention, the product accounts may be generated based on the type of financial transactions performed by the user.

For example, if the user specifies that a certain amount of money is received via direct deposit, then, in response, a direct deposit revenue account may be generated. In another example, when the user generates a pay stub for an employee that indicates direct deposit using a payroll stand-alone product, then the stand-alone product may generate a payroll direct deposit bank account. As shown in the examples, users that perform direct deposit may have different accounts generated than users that do not perform direct deposits.

The stand-alone modifies the product accounts when financial transactions are performed with the stand-alone product (Step 235). Determining which product accounts to modify may be performed based on one or more rules. Specifically, a rule may exist for each financial transaction that is performed by the stand-alone product. The rule may specify which product accounts to update for the financial transaction. In one or more embodiments of the invention, the rules are predefined in the stand-alone product.

Further, when the user requests to view financial transaction data associated with the product accounts, then the financial transaction data is displayed using the stand-alone product interface (Step 237). The stand-alone product interface displays the financial transaction data so as to hide the fact that multiple product accounts exists.

For example, if multiple product accounts are updated with the same value for a single component of the financial transactions, then the stand-alone product may display the value only once. As a further example, consider the scenario in which the single component is federal unemployment tax, which is paid based on an employee's paycheck (i.e., the financial transaction in the example). In the example, an expense account and a liability account may be updated with the amount of the federal unemployment tax. However, when the user wants to view the financial transaction data, the user may be only allowed to see the amount of the federal unemployment tax next to the name, "federal unemployment tax". The fact that both an expense account and a liability account is updated with the amount of the federal unemployment tax is hidden from the user.

Continuing with FIG. 3, a determination is made whether to upgrade to the integrated financial product (Step 239). If the user decides to upgrade to the integrated financial product, then the user may cease to use the stand-alone product in accordance with one or more embodiments of the invention.

FIG. 4 shows a flowchart of a method for the integrated financial product to access the standalone product accounts in accordance with one or more embodiments of the invention. Initially, the integrated financial product is activated (Step 251). Activating the integrated financial product may be performed using any technique known in the art.

After or while activating the integrated financial product, account names and balances are received from the user (Step 253). Specifically, the integrated financial product may guide the user as discussed above (in Step 211 of FIG. 2). Further, the integrated financial product determines whether to aggregate product accounts (Step 255). For example, if the user submits information indicating the use of the same actual account to perform transactions represented by two different standalone product accounts, then the integrated financial product may aggregate the two different product accounts into a single product account.

If a determination is made to aggregate product accounts, then the product accounts are aggregated in accordance with one or more embodiments of the invention (Step 257). Aggregating the product accounts may include copying financial transaction data from one product account into another product account and removing the first product account. Alternatively, the integrated financial product may create a new product account having the financial transaction data from both of the product accounts to be aggregated. Further, redundant financial transaction data (i.e., data that represents the same component of the same financial transaction) may be removed. One skilled in the art will appreciate that other operations may be performed to aggregate the product accounts as required.

Regardless of whether product accounts are aggregated, product accounts' names and balances may be updated to reflect the user's actual account names and balances (Step 259). Specifically, the user's actual account names and balances are added to the financial transaction data. Further, if the user submits information (e.g., user name, password) that allows the integrated financial product to access an online financial account (e.g., a bank account, credit card account, etc.) of the user, then the integrated financial product may collect a transaction history from the online financial account. After collecting the transaction history, updating the product accounts may include reconciling the transaction history with the data in the product accounts.

In one or more embodiments of the invention, the financial transaction data may be accessed using a financial module of the integrated financial product (Step 261). The financial module provides distinct functionality from the stand-alone product. For example, the financial module may create a balance sheet for the user that includes transactions occurring before the upgrade to the integrated financial product.

Below is an example, which is solely for exemplary purposes and is not intended to limit the scope of the invention. In the following example, consider the scenario in which the stand-alone product is a payroll product and the integrated financial product is an Enterprise Resource Planning (ERP) program or an accounting information system, including payroll and various levels of accounting services, among others. Further, in the example, the product storage module is a database and each product account is stored as a table in the database.

In the example, when the user uses the payroll product, various accounts may be created and stored as tables in the database. For example, during normal use of the stand-alone product numerous accounts may be created (with our without the user's knowledge), such as numerous bank accounts, several accounts payable accounts, several expense accounts, and a few asset accounts.

Continuing with the example, during the use of the payroll product, the aforementioned accounts may be updated and new accounts created. Specifically, new entries may be added and stored as tables in the database. Further, a single table may be used to relate the entries to a financial transaction. For example, FIG. 5 shows a table (300), which depicts how the stand-alone payroll product may update the various exemplary accounts discussed above when payroll transactions are performed in accordance with one or more embodiments of the invention.

In the example table, the first column (302) represents a payroll item that might appear on a paycheck or a tax payment. The payroll items shown in the list are intended only as an example. More or fewer payroll items may exist. Each payroll item in the first column may be a component of a financial transaction. The second column (304) shows which expense accounts are updated for the payroll item. The third column (306) shows which liability accounts are updated for the payroll item. The last column (308) shows which asset accounts are updated for the payroll item.

As shown in the example table, multiple accounts may be updated based on the same payroll item. For example, financial transaction data about a Medicare payment for a paycheck is added to both the payroll expense account and the payroll tax payable account (i.e., a liability account). In another example, financial transaction data about a simple company match IRA is added to the payroll expense account as well as the payroll clearing account. Thus, the stand-alone product stores all the summary information and details of each paycheck and liability payment check in the appropriate payroll accounts of the product storage module. Further, the stand-alone payroll product may also store each account, employee, payment agency (federal government, health insurance company, etc), and payroll item (tax, compensation, deduction, addition) in separate tables in the same database.

Continuing with the example, while the user is using the payroll product, the user may desire to upgrade to a full integrated financial product (such as an ERP or an accounting information system) that has more robust accounting services. The accounting module of the integrated financial product includes the functionality to extract financial transaction data collected by the payroll product data in such a way as to produce a Profit and Loss, Balance Sheet, or Cash Flow statement, or a Trial Balance (the ending balances for all accounts for a certain period) or General Ledger (all transactions for an account in a certain period) by simply using the data stored in the database from using only the payroll product. In the example, the user can easily upgrade from the payroll product to the full integrated financial product because the same (or essentially the same) database tables exist in both products.

Figure 6:
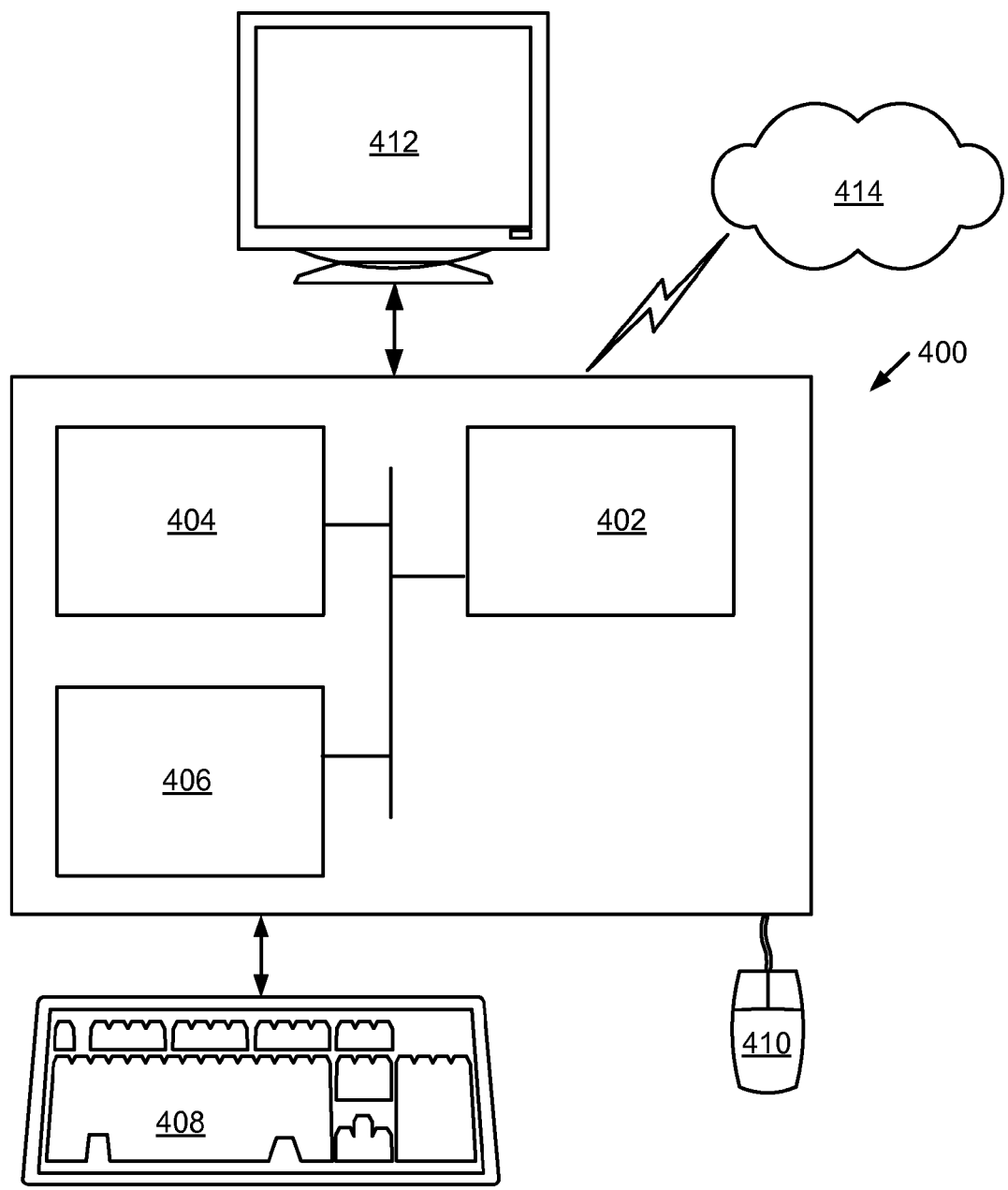
FIG. 6 shows a computer system in accordance with one or more embodiments of the invention.

Embodiments of the invention may be implemented on virtually any type of computer regardless of the platform being used. For example, as shown in FIG. 6, a computer system (400) includes one or more processor(s) (402), associated memory (404) (e.g., random access memory (RAM), cache memory, flash memory, etc.), a storage device (406) (e.g., a hard disk, an optical drive such as a compact disk drive or digital video disk (DVD) drive, a flash memory stick, etc.), and numerous other elements and functionalities typical of today's computers (not shown). The computer (400) may also include input means, such as a keyboard (408), a mouse (410), or a microphone (not shown). Further, the computer (400) may include output means, such as a monitor (412) (e.g., a liquid crystal display (LCD), a plasma display, or cathode ray tube (CRT) monitor). Alternatively, the input means and the output means for the computer (400) may exist in a mobile device, such as a cellular telephone, a personal digital assistant, a laptop computer, a smart phone, or any other type of mobile device. The computer system (400) may be connected to a network (414) (e.g., a local area network (LAN), a wide area network (WAN) such as the Internet, or any other similar type of network) via a network interface connection (not shown). Those skilled in the art will appreciate that many different types of computer systems exist, and the aforementioned input and output means may take other forms. Generally speaking, the computer system (400) includes at least the minimal processing, input, and/or output means necessary to practice embodiments of the invention.

Further, those skilled in the art will appreciate that one or more elements of the aforementioned computer system (400) may be located at a remote location and connected to the other elements over a network. Further, embodiments of the invention may be implemented on a distributed system having a plurality of nodes, where each portion of the invention (e.g., product storage medium, financial product, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

Embodiments of the invention simplify the update from a stand-alone product to an integrated financial product. Specifically, in one or more embodiments of the invention, the stand-alone product generates multiple product accounts which are hidden to the user because having data in the multiple product accounts is beneficial when upgrading to the integrated financial product. Thus, when the user upgrades to the integrated financial product, the integrated financial product has a record of the financial transactions performed using the stand-alone product that is stored in a manner usable by the integrated financial product.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for upgrading from a stand-alone product to an integrated financial product, comprising:
    receiving, by the stand-alone product executing on a computer processor, financial transaction data describing at least one financial transaction performed by a user;

storing, by the stand-alone product, the financial transaction data, in
the plurality of product accounts at a greater granularity than required by the stand-alone product by:
crediting a first product account of the plurality of product accounts, and
debiting a second product account of the plurality of product accounts,
wherein the stand-alone product stores the financial transaction data prior to activating the integrated financial product,
wherein the stand-alone product hides the existence of the plurality of product accounts from the user, and
wherein the greater granularity is required for the integrated financial product to perform accounting functions,
activating, the integrated financial product after the storing of the financial transaction data by the stand-alone product, wherein activating the integrated financial product allows the user to access a financial module of the integrated financial product;
receiving, from the user after activating the integrated financial product, a user account name and a user account balance for each of a plurality of user accounts;
reconciling, by the computer processor, the plurality of product accounts with the plurality of user accounts by:
identifying, for each user account of the plurality of user accounts, a corresponding product account of the plurality of product accounts; and
correcting a product account name and a product account balance of the corresponding product account when the product account name and the product account balance does not match the user account name and the user account balance of the user account; and
accessing, by the financial module of the integrated financial product executing on the computer processor, the financial transaction data at the greater granularity to present the financial transaction data at the greater granularity to the user,
wherein functionality provided by the stand-alone product is distinct from functionality provided by the financial module, and
wherein the stand-alone product and the integrated financial product are software applications.

2. The method of claim 1, wherein the financial transaction data is accessible at the greater granularity via an interface of the integrated financial product.

3. The method of claim 1, wherein accessing financial transaction data at the greater granularity comprises aggregating the financial transaction data into a report, wherein the financial transaction data is accessible to the user at the greater granularity by displaying the report.

4. The method of claim 3, wherein the report is one selected from a group consisting of a profit and loss statement, a balance sheet, a cash flow statement, a trial balance, and a general ledger.

5. The method of claim 1, wherein the plurality of product accounts is generated based on use of the stand-alone product by the user.

6. The method of claim 1, wherein the stand-alone product comprises at least one selected from a group consisting of an invoice product and a payroll product.

7. The method of claim 1, wherein the plurality of product accounts comprises at least one selected from a group consisting of a checking bank account, a direct deposit bank account, a direct deposit payable account, a payroll expense account, a payroll expense extra charge account, a payroll tax payable account, a payroll clearing account, an employee cash advance account, accounts receivable, accounts payable.

8. A system comprising:
a computer processor;
a product storage module configured to:
store a plurality of product accounts;
a stand-alone product used by a user, configured to execute on the computer processor, and
configured to:
generate the plurality of product accounts associated with the user of the stand-alone product;
receive financial transaction data describing at least one financial transaction performed by the user; and
store financial transaction data in the plurality of product accounts at a greater granularity than required by the stand-alone product by:
crediting a first product account of the plurality of product accounts, and debiting a second product account of the plurality of product accounts an
wherein the stand-alone product stores the financial transaction data prior to activating the integrated financial product,
wherein the stand-alone product hides the existence of the plurality of product accounts from the user, and
wherein the greater granularity is required by financial transaction data comprises at least a portion that is stored by the stand alone product for the integrated financial product to perform accounting functions; and
a financial module of the integrated financial product configured to:
receive, from the user after activating the integrated financial product, a user account name and a user account balance for each of a plurality of user accounts;
reconcile the plurality of product accounts with the plurality of user accounts by:
identifying, for each user account of the plurality of user accounts, a corresponding product account of the plurality of product accounts; and
correcting a product account name and a product account balance of the corresponding product account when the product account name and the product account balance does not match the user account name and the user account balance of the user account;
access the financial transaction data at a greater granularity to present the financial transaction data to the user,
wherein the integrated financial product is activated after the storing of the financial transaction data by the stand-alone product, wherein activating the integrated financial product allows the user to access a financial module of the integrated financial product,
wherein functionality provided by the stand-alone product is distinct from functionality provided by the financial module, and
wherein the stand-alone product and the integrated financial product are software applications.

9. The system of claim 8, wherein the stand-alone product is further configured to:
display of the financial transaction data at the greater granularity.

10. The system of claim 8, wherein accessing the financial transaction data at the greater granularity comprises:
aggregating the financial transaction data into a report; and
displaying the report.

11. The system of claim 10, wherein the report is one selected from a group consisting of a profit and loss statement, a balance sheet, a cash flow statement, a trial balance, and a general ledger.

12. The system of claim 11, wherein the plurality of product accounts is generated based on use of the stand-alone product by the user.

13. The system of claim 8, wherein the stand-alone product comprises at least one selected from a group consisting of an invoice product and a payroll product.

14. The system of claim 8, wherein the plurality of product accounts comprises at least one selected from a group consisting of a checking bank account, a direct deposit bank account, a direct deposit payable account, a payroll expense account, a payroll expense extra charge account, a payroll tax payable account, a payroll clearing account, an employee cash advance account, an account receivable, and an account payable.

15. A non-transitory computer readable storage medium comprising computer readable program code for a stand-alone product embodied therein for causing a computer system to perform a method, the method comprising:
generating a plurality of product accounts associated with a user of the stand-alone product;
receiving financial transaction data describing at least one financial transaction performed by the user; and
storing the financial transaction data in the plurality of product accounts at a greater granularity than required by the stand-alone product by:
crediting a first product account of the plurality of product accounts, and
debiting a second product account of the plurality of product accounts,
wherein the stand-alone product stores the financial transaction data prior to activating the integrated financial product,
wherein the stand-alone product hides the existence of the plurality of product accounts from the user, and
wherein the greater granularity is required for the integrated financial product to perform accounting functions,
wherein the integrated financial product is activated after the storing of the financial transaction data by the stand-alone product, wherein activating the integrated financial product allows the user to access a financial module of the integrated financial product,
wherein the integrated financial product:
receives, from the user after activating the integrated financial product, a user account name and a user account balance for each of a plurality of user accounts;
reconciles, by the computer processor, the plurality of product accounts with the plurality of user accounts by:
identifying, for each user account of the plurality of user accounts, a corresponding product account of the plurality of product accounts; and
correcting a product account name and a product account balance of the corresponding product account when the product account name and the product account balance does not match the user account name and the user account balance of the user account;
wherein the financial transaction data is accessed at the greater granularity by the financial module of the integrated financial product to present the financial transaction data at the greater granularity to the user,
wherein functionality provided by the stand-alone product is distinct from functionality provided by the financial module, and
wherein the stand-alone product and the integrated financial product are software applications.

16. The non-transitory computer readable storage medium of claim 15, wherein the functional module:
displays of the financial transaction data at the greater granularity in an interface.

17. The non-transitory computer readable storage medium of claim 15, wherein the functional module:
aggregates the financial transaction data into a report, wherein the report comprises at least one selected from a group consisting of a profit and loss statement, a balance sheet, a cash flow statement, a trial balance, and a general ledger.

18. The non-transitory computer readable storage medium of claim 15, wherein the plurality of product accounts is generated based on use of the stand-alone product by the user.

19. The non-transitory computer readable storage medium of claim 15, wherein the plurality of product accounts comprises at least one selected from a group consisting of a checking bank account, a direct deposit bank account, a direct deposit payable account, a payroll expense account, a payroll expense extra charge account, a payroll tax payable account, a payroll clearing account, and an employee cash advance account.

* * * * *